Patented Oct. 7, 1941

2,258,143

UNITED STATES PATENT OFFICE 2,258,143

IMMOBILIZING PRODUCT FOR FRACTURES OF THE HUMAN BODY

Chester Orrin Padelford, Glen Ridge, N. J.

No Drawing. Application August 25, 1938, Serial No. 226,835

4 Claims. (Cl. 128—91)

This invention relates to improved products for the use of physicians in immobilizing fractures of the human body.

Plaster of Paris has for many years been quite universally used for immobilizing fractures; but it is the common experience of physicians that the use of this material for the immobilization of fractured limbs results in discomfort and complaint from patients, and is attended with disadvantages including the excessive weight of the immobilizing material. The amount of plaster of Paris required and its composition interferes with the taking of clear X-ray pictures of the fracture; and the difficulty in removing a plaster of Paris cast is well known to physicians. Nevertheless, plaster of Paris continues to be used for immobilizing fractures of the human body despite the objections and discomfort accompanying such use.

The present invention provides an improved immobilizing product for fractures of the human body which overcomes or minimizes to a large extent the objections and disadvantages of the ordinary plaster of Paris casts. Casts made of the new immobilizing material are easier to remove, harder, lighter in weight than plaster of Paris casts, due to the fact that less bandage is required, enable clear X-ray pictures of the fracture to be taken, enable the time for setting of the immobilizing material to be materially reduced and regulated, are more readily removed than ordinary plaster of Paris casts, and decrease the discomfort of the patient.

According to the present invention, an immobilizing product for fractures is produced by applying to a fabric base a specially compounded alpha gypsum of high purity comprising practically pure calcium sulphate hemi-hydrate obtainable by steam pressure calcination, made up of short thick crystals compounded with small amounts of chemicals which regulate and control the setting time of the alpha gypsum and enable it to give a rapidly setting cast of regulated setting time. The term alpha gypsum is used to identify the practically pure calcium sulphate hemihydrate obtained by steam pressure calcination and having the property when hydrated and set of permitting clear-cut X-ray pictures. The method of manufacturing the alpha gypsum and the properties thereof are more fully described in the patent to Randell and Dailey No. 1,901,051.

The fabric base used in producing the new immobilizing product may be gauze, muslin or like open-mesh fabric suitably sized or stiffened. To the fabric base is applied a layer of the compounded alpha gypsum, and the fabric base with the applied layer in position may be then rolled into bandage form similar to that of the ordinary plaster of Paris bandages. It is one advantage of the present invention that it enables the same or a similar fabric to be used as is used in ordinary plaster of Paris bandages, and the compounded alpha gypsum composition can be applied thereto in the same or a similar manner to that used in applying ordinary plaster of Paris; but the resulting improved immobilizing product has important advantages over the ordinary plaster of Paris bandages, such as those above referred to.

The chemicals which are compounded with the alpha gypsum enable the setting time to be regulated and controlled so that the product, when wet and applied for the immobilization of fractures, will set in a regulated setting time of between five and fifteen minutes. I have found that small amounts of sulphates enable this regulated setting to be obtained and I have found a mixture of potassium aluminum sulphate and magnesium sulphate particularly valuable for this purpose.

The invention will be further illustrated by the following specific examples but it will be understood that the invention is not limited thereto.

*Example I.*—Alpha gypsum of the character above referred to and marketed under the trade name "Hydrocal" is compounded with a small amount of potassium sulphate, ammonium aluminum sulphate and oxyquinoline sulphate as a germicide in the following proportions:

White or gray alpha gypsum (Hydrocal)__ 96.94
Potassium sulphate_____ 1.00
Potassium aluminum sulphate_____ 1.75
Oxyquinoline sulphate_____ .06

The oxyquinoline sulphate used in a dilution of 1:2000 is compounded with the powdered ammonium aluminum sulphate and potassium sulphate and these are then intimately and thoroughly mixed with the alpha gypsum to secure thorough admixture and the powder is then spread on a fabric base and rolled into bandage form. The resulting bandage, when wet by soaking in water and then applied in bandage form sets in approximately 10 minutes.

*Example II.*—Alpha gypsum of the character above referred to and in the form marketed commercially under the trade name "Hydrocal" is intimately compounded with potassium aluminum sulphate and magnesium sulphate in the following proportions:

White or gray alpha gypsum (Hydrocal)__ 97.50
Potassium Aluminum sulphate_____ 1.75
Magnesium sulphate (dried)_____ .75

The potassium aluminum sulphate and magnesium sulphate are intimately mixed with each other and then with the alpha gypsum to secure thorough admixture and this composition is then applied to a fabric base and rolled into bandage form. When this roll is immersed in water and becomes wet it can then be unrolled and applied to the fractured limb. It will set in about five minutes and much less of the product is required than of ordinary plaster of Paris bandages for immobilizing fractures.

As a result a much lighter and thinner cast is obtained and the cast is more easily removed. It is one of the advantages of the new immobilizing product that when applied as a cast, clear cut X-ray pictures can be obtained of the fracture with materially reduced penetration and exposure.

As an example of the advantages obtainable with the improved immobilizing product of the present invention, a walking cast was made from the product of Example II with the result that the patient was allowed to walk about the hospital about thirty minutes after the cast was applied. As a result the patient was enabled to leave the hospital much sooner than would have been possible with the ordinary plaster of Paris cast; while the cast was of materially less weight and when it had served its purpose was much more readily removed.

I have found that a further improved immobilizing product can be obtained by adding a small amount of titanium dioxide in compounding the alpha gypsum in making the new product. By adding, for example, about 5% of pure titanium oxide to the composition, a very white cast can be obtained; and the addition of the titanium oxide appears to lessen somewhat the tendency to brittleness in the final drying without objectionably affecting the other desirable properties of the product. As a further example of the invention, 5% of titanium dioxide is added to the composition described in Example II and thoroughly admixed therewith and the resulting composition then applied to a fabric base and treated in a similar manner to that described in connection with Example II.

The improved immobilizing products of the present invention enables casts to be made which will set quickly and in a regulated time of e. g. 5 to 7 minutes and e. g. 12 to 15 minutes, it gives casts harder and lighter in weight and thinner than plaster of Paris casts which are more permeable to X-rays giving very clear X-ray pictures without shadows and with a materially reduced exposure time, which require less time of the patient in the hospital before the cast is set so that the patient can leave, e. g. in the case of limb fractures, and materially reduce the discomfort of the patient.

I claim:

1. An improved immobilizing product comprising a fabric base having applied thereto a composition comprising alpha gypsum compounded with small amounts of chemicals to regulate the setting time and adapted when wet and applied to a fracture to set in a regulated period of from five to fifteen minutes to give a hard, light and thin cast, and said cast being sufficiently permeable to X-rays to permit the taking of clear cut X-ray pictures.

2. An improved immobilizing product comprising a fabric base having applied thereto a composition comprising alpha gypsum compounded with small amounts of potassium aluminum sulphate and magnesium sulphate to regulate the setting time, said product being adapted when wet and applied to a fracture to set in a regulated period of from five to fifteen minutes to give a hard, light and thin cast and said cast being sufficiently permeable to X-rays to permit the taking of clear-cut X-ray pictures.

3. An improved immobilizing product comprising a fabric base having applied thereto a composition comprising alpha gypsum compounded with chemicals to regulate the setting time and adapted when wet and applied to a fracture to set in a regulated period of from five to fifteen minutes.

4. An improved immobilizing product comprising a fabric base having applied thereto a composition comprising alpha gypsum compounded with potassium aluminum sulphate and magnesium sulphate to regulate the setting time, said product being adapted when wet and applied to a fracture to set in a regulated period of from five to fifteen minutes.

CHESTER ORRIN PADELFORD.

CERTIFICATE OF CORRECTION.

Patent No. 2,258,143. October 7, 1941.

CHESTER ORRIN PADELFORD.

It is hereby certified that error appears in the printed specification of the above numbered patent requiring correction as follows: Page 1, second column, line 32, Example I, for "Potassium aluminum sulphate ----- 1.75"

read

--Ammonium aluminum sulphate ----- 2.00--;

and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.